(12) United States Patent
Sakamoto

(10) Patent No.: US 7,476,177 B2
(45) Date of Patent: Jan. 13, 2009

(54) METHOD AND APPARATUS FOR ESTIMATING TRANSMISSION RATIO

(75) Inventor: Takuya Sakamoto, Akashi (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 359 days.

(21) Appl. No.: 11/481,563

(22) Filed: Jul. 5, 2006

(65) Prior Publication Data

US 2007/0021268 A1    Jan. 25, 2007

(30) Foreign Application Priority Data

Jul. 7, 2005    (JP)    ............... 2005-198645

(51) Int. Cl.
 *B60W 10/04*    (2006.01)
 *F16H 59/60*    (2006.01)
 *G06F 7/00*    (2006.01)
(52) U.S. Cl. ............... 477/34; 477/97; 701/61
(58) Field of Classification Search ............... 477/34, 477/97; 701/51, 57, 58, 60, 61; 73/115.01, 73/115.02
See application file for complete search history.

(56) References Cited

U.S. PATENT DOCUMENTS

| | | | | |
|---|---|---|---|---|
| 5,073,859 A | * | 12/1991 | Suzuki | 701/61 |
| 5,683,326 A | * | 11/1997 | Inoue | 476/10 |
| 5,948,033 A | * | 9/1999 | Baer et al. | 701/51 |
| 6,073,072 A | * | 6/2000 | Ishii et al. | 701/63 |
| 6,295,497 B1 | * | 9/2001 | Kuras | 701/51 |
| 2005/0072965 A1 | * | 4/2005 | Sanders et al. | 254/361 |

FOREIGN PATENT DOCUMENTS

JP    2002-201973    7/2002

* cited by examiner

*Primary Examiner*—Roger Pang
(74) *Attorney, Agent, or Firm*—Alleman Hall McCoy Russell & Tuttle LLP

(57) ABSTRACT

A method and apparatus for estimating a transmission ratio of a power transmission path defined between input and output shafts is provided. The method includes detecting a rotational speeds of the input and output shafts, calculating a rotational-speed ratio between the detected rotational speeds of the input and output shafts, determining whether or not a difference between the rotational-speed ratio calculated at a certain time and a rotational-speed ratio calculated earlier is within a first threshold, and estimating a value relating to the later rotational-speed ratio to be the transmission ratio and storing the value in a memory if the difference between the rotational-speed ratios is determined to be within the first threshold, while estimating a value relating to the earlier rotational-speed ratio stored in the memory to be the transmission ratio if the difference between the rotational-speed ratios is determined not to be within the first threshold.

6 Claims, 9 Drawing Sheets

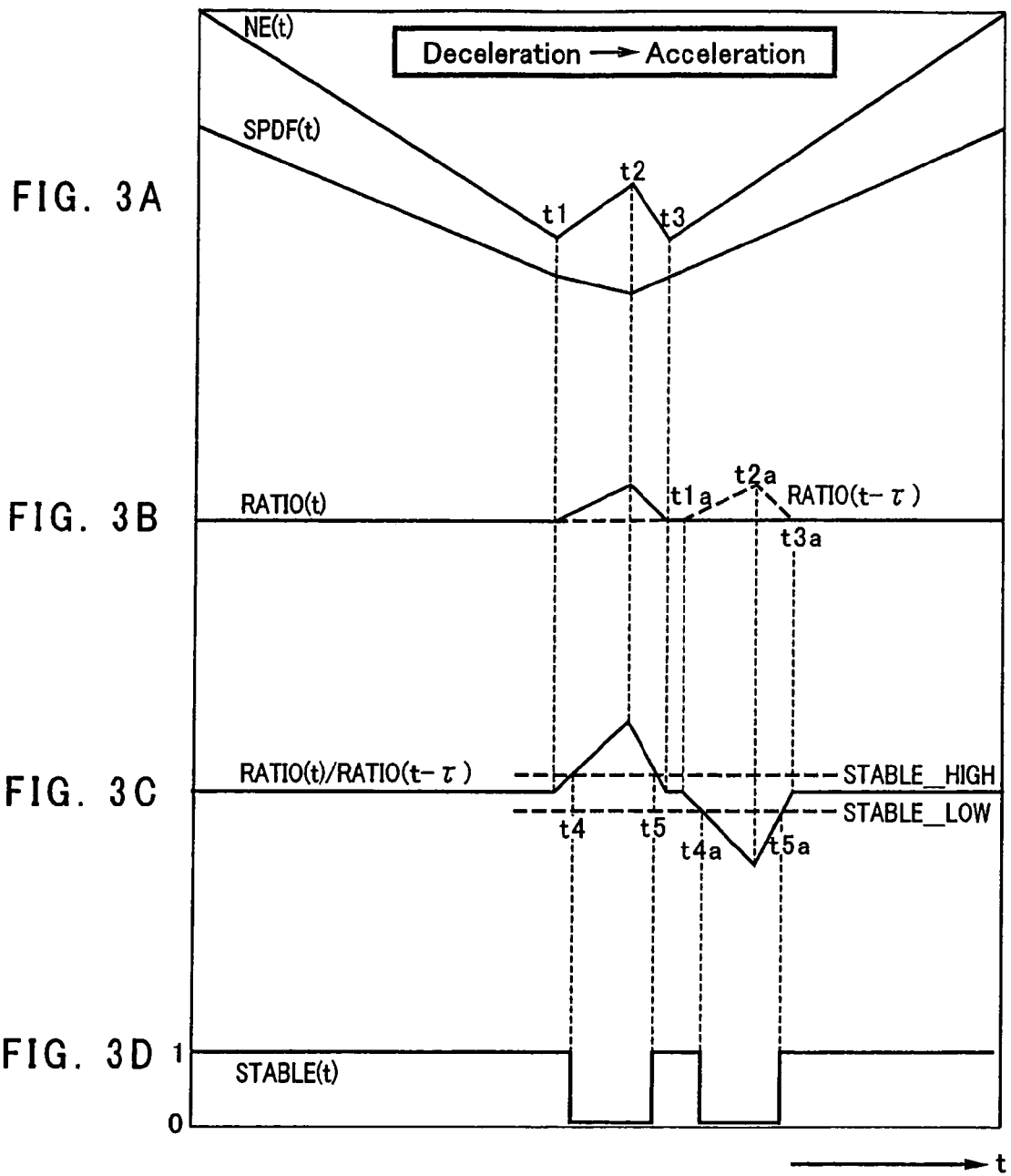

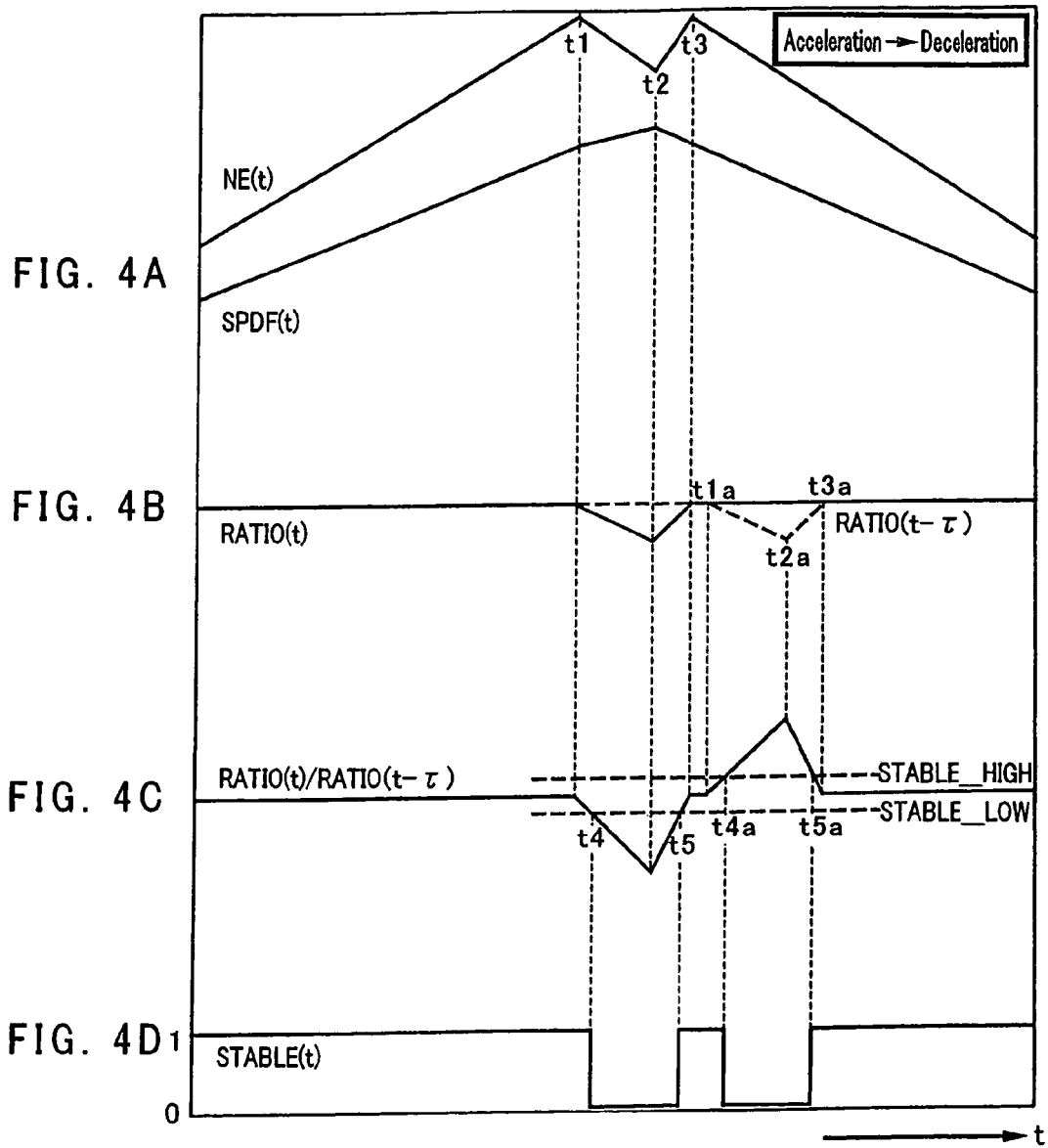

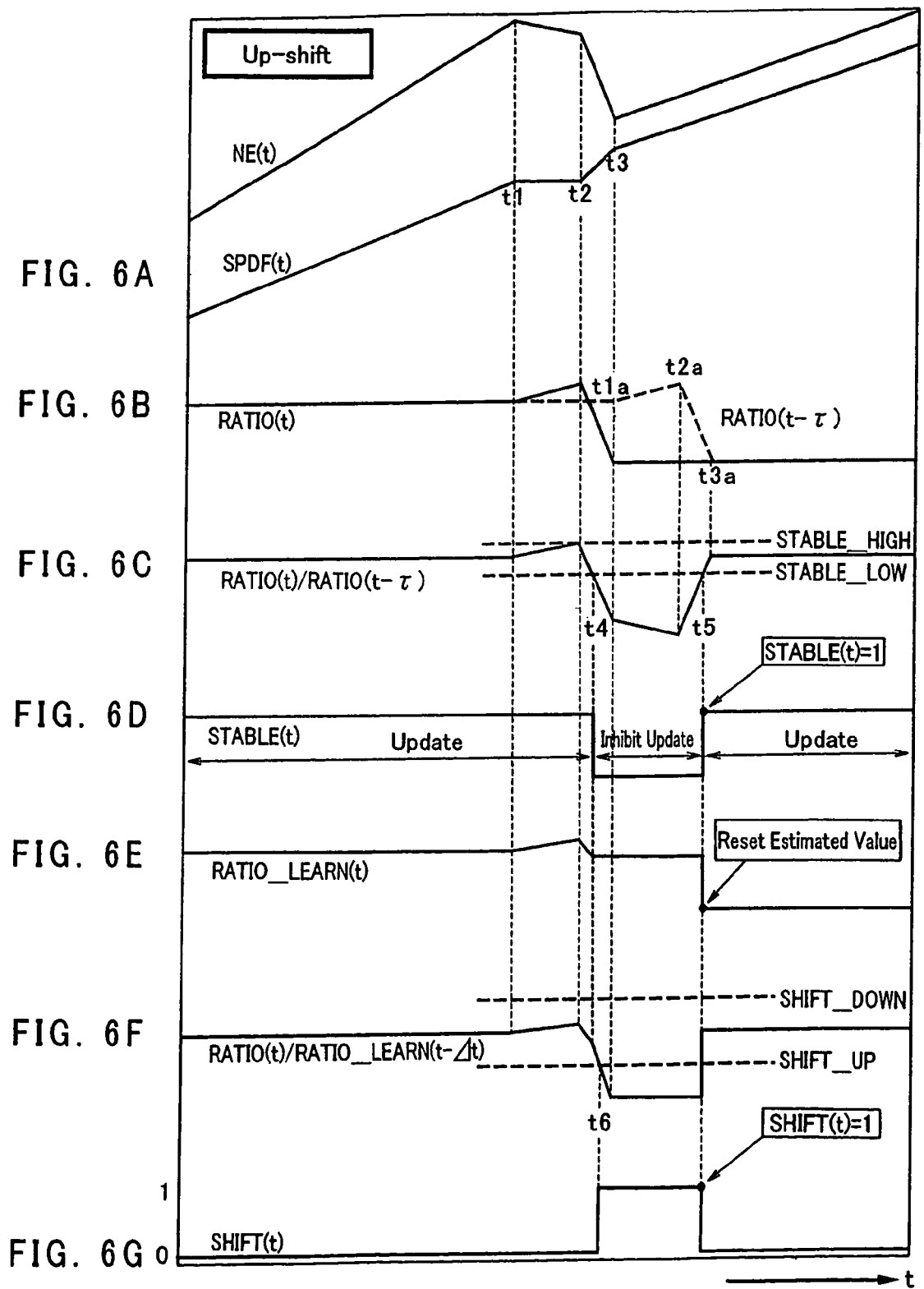

METHOD AND APPARATUS FOR ESTIMATING TRANSMISSION RATIO

CROSS-REFERENCE TO RELATED APPLICATION

This application is based on and claims priority to Japanese Patent Application No. 2005-198645, the entire disclosure of which is incorporated herein by reference.

TECHNICAL FIELD

The present invention relates to a method of estimating a transmission ratio, more particularly, to a method and apparatus for estimating a transmission ratio of a specific section in a power transmission path.

BACKGROUND OF THE INVENTION

For example, a value of a transmission ratio may be useful for controlling a vehicle, such as an automobile. Generally, the transmission ratio value may be obtained by the following methods. The first method is called a "Transmission Ratio Embedding Method", and the second method is called a "Rotational-speed Ratio Calculating Method."

The Transmission Ratio Embedding Method embeds values (in this case, gear reduction ratios or transmission ratios) as a control parameter into a control program, and selects one of the transmission ratio values based on a value detected by a gear position sensor. The Rotational-speed Ratio Calculating Method is disclosed, for example, in Japanese Unexamined Patent Publication No. 2002-201973, in which a value of the transmission ratio is calculated based on a rotational speed of a driving source (for example, a rotational speed of a crankshaft of an internal combustion engine), and a vehicle traveling speed (for example, a rotational speed of a speed sensor shaft). The entire disclosure of Japanese Unexamined Patent Publication No. 2002-201973 is incorporated herein by reference.

However, the Transmission Ratio Embedding Method may require a correction of the control parameter when an actual transmission ratio is changed by, for example, a change in design of the transmission. Further, the Rotational-speed Ratio Calculating Method tends to output a value that can be unstable because of, for example, a slight change in the transmission ratio by backlash of gears, a damping effect of a damper element (e.g., a coupling damper), etc.

BRIEF SUMMARY OF THE INVENTION

The present invention addresses the above conditions, and provides a method and apparatus for estimating a transmission ratio that does not require a correction of a control parameter even when design of the transmission is changed, and can output a stable estimated transmission ratio value even when there is a slight change or instability in the actual transmission ratio.

According to one aspect of the present invention, a method of estimating a transmission ratio of a power transmission path defined between an input shaft and an output shaft is provided. The method includes detecting a rotational speed of the input shaft. The method includes detecting a rotational speed of the output shaft. The method includes calculating a rotational-speed ratio between the detected rotational speed of the input shaft and the detected rotational speed of the output shaft. The method includes determining whether or not a difference between the rotational-speed ratio calculated at a certain time and a rotational-speed ratio calculated earlier is within a first predetermined threshold value. The method includes estimating a value relating to the later rotational-speed ratio to be the transmission ratio of the power transmission path and storing the value in a memory if the difference between the rotational-speed ratios is determined to be within the first predetermined threshold value, while estimating a value relating to the earlier rotational-speed ratio stored in the memory to be the transmission ratio of the power transmission path if the difference between the rotational-speed ratios is determined not to be within the first predetermined threshold value.

According to another aspect of the present invention, an apparatus for estimating a transmission ratio of a power transmission path defined between an input shaft and an output shaft is provided. The apparatus includes an input shaft sensor for detecting a rotational speed of the input shaft. The apparatus includes an output shaft sensor for detecting a rotational speed of the output shaft. The apparatus includes a rotational-speed ratio calculating module configured to calculate a rotational-speed ratio between the rotational speed of the input shaft detected by the input shaft sensor and the rotational speed of the output shaft detected by the output shaft sensor. The apparatus includes a stability detecting module configured to determine whether or not a difference between the rotational-speed ratio calculated at a certain time by the rotational-speed ratio calculating module and the rotational-speed ratio calculated earlier by the rotational-speed ratio calculating module is within a first predetermined threshold value. The apparatus includes an estimating module configured to estimate a value relating to the later rotational-speed ratio to be the transmission ratio of the power transmission path and store the value in a memory if the difference between the rotational-speed ratios is determined to be within the first predetermined threshold value by the stability detecting module, while estimate a value relating to the earlier rotational-speed ratio stored in the memory to be the transmission ratio of the power transmission path if the difference between the rotational-speed ratios is determined not to be within the first predetermined threshold value.

The value relating to the rotational-speed ratio may be a moving average value of the rotational-speed ratios calculated by the rotational-speed ratio calculating module.

The apparatus may further include a gear-shift detecting module configured to determine whether or not the difference between the later rotational-speed ratio calculated by the rotational-speed ratio calculating module and the transmission ratio estimated earlier by the estimating module is within a second predetermined threshold value.

The gear-shift detecting module may be configured to determine a downshift if the rotational-speed ratio is greater than the transmission ratio, and may determine an upshift if the rotational-speed ratio is less than the transmission ratio.

The estimating module may be configured to estimate the value relating to the later rotational-speed ratio to be the transmission ratio of the power transmission path and store the value in the memory if the difference between the rotational-speed ratios is determined to be within the first predetermined threshold value by the stability detecting module, and if the difference between the later rotational-speed ratio and the transmission ratio is determined to be within the second predetermined threshold value by the gear-shift detecting module. Furthermore, the estimating module may be configured to estimate the value relating to the earlier rotational-speed ratio stored in the memory to be the transmission ratio of the power transmission path if the difference between the rotational-speed ratios is determined not to be within the first predetermined threshold value by the stability detecting module, and if the difference between the later rotational-speed ratio and the transmission ratio is determined not to be within the second predetermined threshold value by the gear-shift detecting module.

The above and further objects and features of the present invention will more fully be apparent from the following detailed description with accompanying drawings.

BRIEF DESCRIPTION OF THE SEVERAL VIEWS OF THE DRAWINGS

FIGS. 3A-3D are graphs showing changes in control parameters of the transmission ratio estimating apparatus of FIG. 2, during a transition from deceleration to acceleration, with a common time represented as the x-axis;

FIGS. 4A-4D are graphs showing changes in the control parameters of the transmission ratio estimating apparatus of FIG. 2, during transition from acceleration to deceleration with a common time represented as the x-axis;

FIGS. 6A-6G are graphs showing changes in the control parameters of the transmission ratio estimating apparatus of FIG. 2, during an upshift, with a common time as x-axis;

DETAILED DESCRIPTION OF THE INVENTION

The present invention will now be described in detail referring to the accompanying drawings illustrating the embodiments thereof.

First Embodiment

Figure 1:
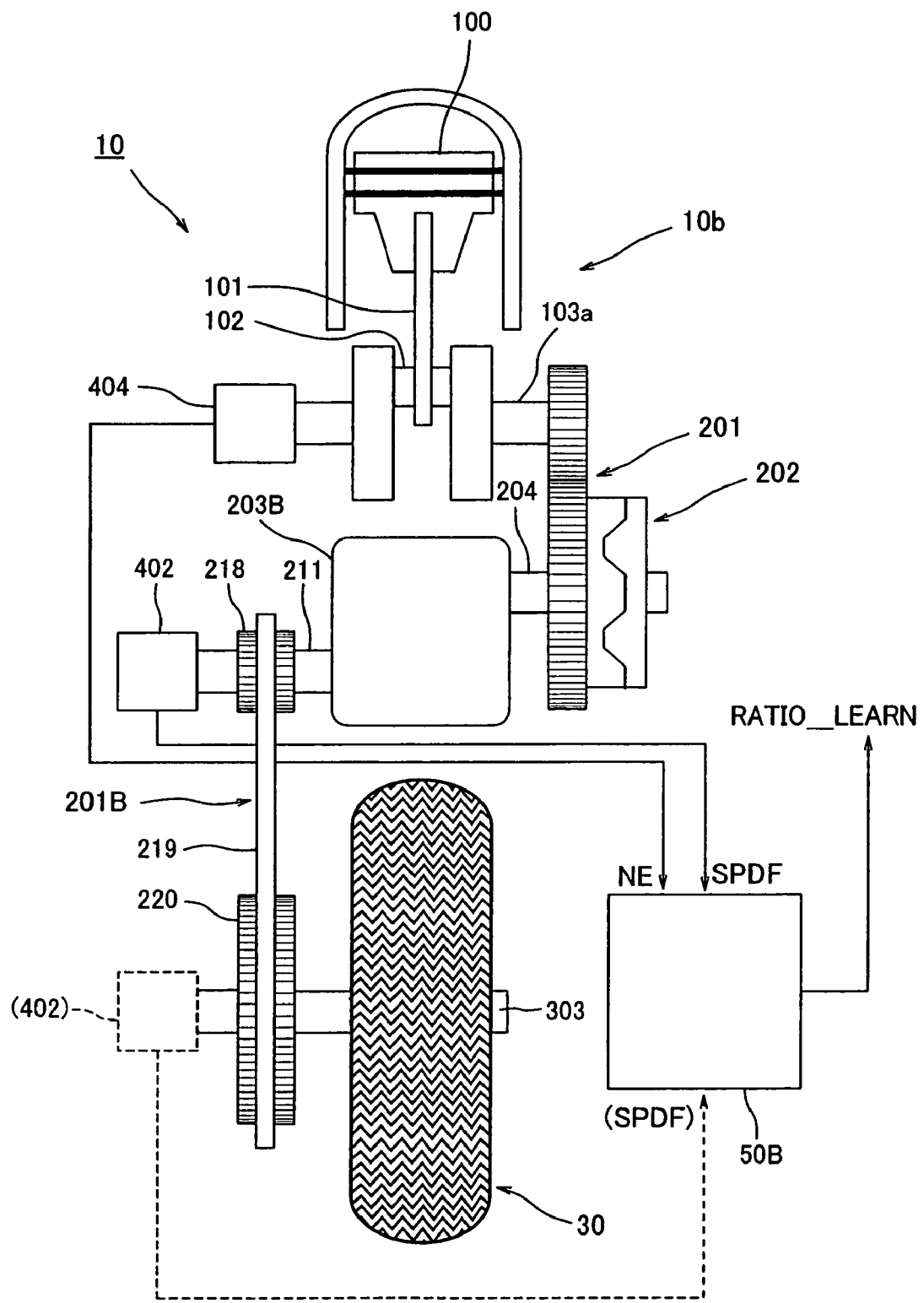
FIG. 1 is a schematic block diagram showing a configuration of a motorcycle according to a first embodiment of the present invention.

FIG. 1 is a schematic block diagram showing a configuration of a motorcycle 10 as one example of a vehicle. The motorcycle 10 is provided with a transmission ratio control apparatus according to an embodiment of the present invention. As shown in FIG. 1, the motorcycle 10 includes an internal-combustion engine 10b as a driving source. In this embodiment, the engine 10b is shown as a reciprocating engine with one cylinder, however, the driving source may be any other suitable internal-combustion engine, or may be another type of driving source, such as an electric motor, etc. Further, the vehicle may be any suitable vehicle other than a motorcycle that is provided with a power transmission path.

In this embodiment, the transmission ratio control apparatus may obtain a substantially stable value of a transmission ratio defined between an input-end-side shaft (input shaft) and an output-end-side shaft (output shaft) of a target power transmission path section. Components of the power transmission path section may not be connected mechanically with each other. For example, the components of the power transmission path section may also be connected electrically. The power transmission path section may not include such a transmission mechanism, but may be a configuration in which a rotational-speed difference is substantially produced between the input shaft and the output shaft. Alternatively, the rotational speed of the input shaft and the output shaft may instead be represented by a linear motion distance which may be considered equivalent to the rotational speed (for example, traveling distance of a chain).

Referring to FIG. 1, the engine 10b includes a piston 100, and a connecting rod 101 that extends downwardly from the piston 100. A lower end portion of the connecting rod 101 is coupled to a crank pin 102. One end portion (right end in FIG. 1) of the crankshaft 103a that continues from the crank pin 102 is coupled to a clutch 202 through a primary transmission system 201. An input shaft sensor 404 is provided in the other end portion (left end in FIG. 1) of the crankshaft 103a. The primary transmission system 201 is coupled to a main shaft 204 which is an input shaft of a transmission device 203B.

In parallel with the main shaft 204 in the transmission device 203B, a drive shaft 211 which is an output shaft of the transmission device 203B is arranged. The drive shaft 211 is provided with a drive sprocket 218 and an output shaft sensor 402.

The drive sprocket 218 is coupled to a driven sprocket 220 through a chain 219. The drive sprocket 218, chain 219, and driven sprocket 220 compose a secondary transmission system 201B. The driven sprocket 220 is also coupled to an axle 303 of the wheel 30.

During a steady operating state of the motorcycle 10, a linear motion of the piston 100 generated by combustion of the internal-combustion engine 10b is converted into a rotational motion of the crankshaft 103a by the connecting rod 101, crank pin 102, and crankshaft 103a, and is inputted into the main shaft 204 through the primary transmission system 201 and clutch 202. Subsequently, the rotational motion is transmitted to the drive shaft 211 through any one combination of one gear on the main shaft 204 and another gear on the drive shaft 211, corresponding to a gear ratio (that is, a shift position). The transmitted rotational motion subsequently drives the drive sprocket 218, chain 219, driven sprocket 220, and wheel 30.

In this embodiment, in order to obtain the transmission ratio between the crankshaft 103a and the drive shaft 211, the input shaft sensor 404 is provided on the crankshaft 103a, and the output shaft sensor 402 is provided on the drive shaft 211. Alternatively, if obtaining a transmission ratio between the crankshaft 103a and the axle 303, the output shaft sensor 402 may instead be provided on the axle 303 as shown with dashed lines in FIG. 1.

In this embodiment, the input shaft sensor 404 detects a rotational speed (an input shaft rotational speed NE) of the crankshaft 103a as the input shaft, and gives the detected speed to a transmission ratio estimating apparatus 50B. The output shaft sensor 402 detects a rotational speed (an output shaft rotational speed SPDF) of the drive shaft 211 as the output shaft, and gives the detected speed to the transmission ratio estimating apparatus 50B.

The transmission ratio estimating apparatus 50B estimates and outputs a transmission ratio of the power transmission path section based on the input shaft rotational speed NE and the output shaft rotational speed SPDF. The transmission ratio estimating apparatus 50B may be utilized as a gear position sensor, clutch switch, neutral switch, etc. of the motorcycle 10. The transmission ratio estimated value RATIO_LEARN as the output value, which will be described later, may be used for various control of the motorcycle 10, other than the purpose described above.

In this embodiment, the transmission ratio estimating apparatus 50B does not simply accept raw data of NE/SPDF (that is, a rotational-speed ratio), similar to the "Rotational-speed Ratio Calculating Method." Instead, the transmission ratio estimating apparatus 50B outputs substantially stable values of the transmission ratio of the target power transmission path section. Therefore, the transmission ratio estimating apparatus 50B is also suitable for use in a situation in which the shift position of the transmission device 203B is frequently changed, such as in an auto race.

Figure 2:
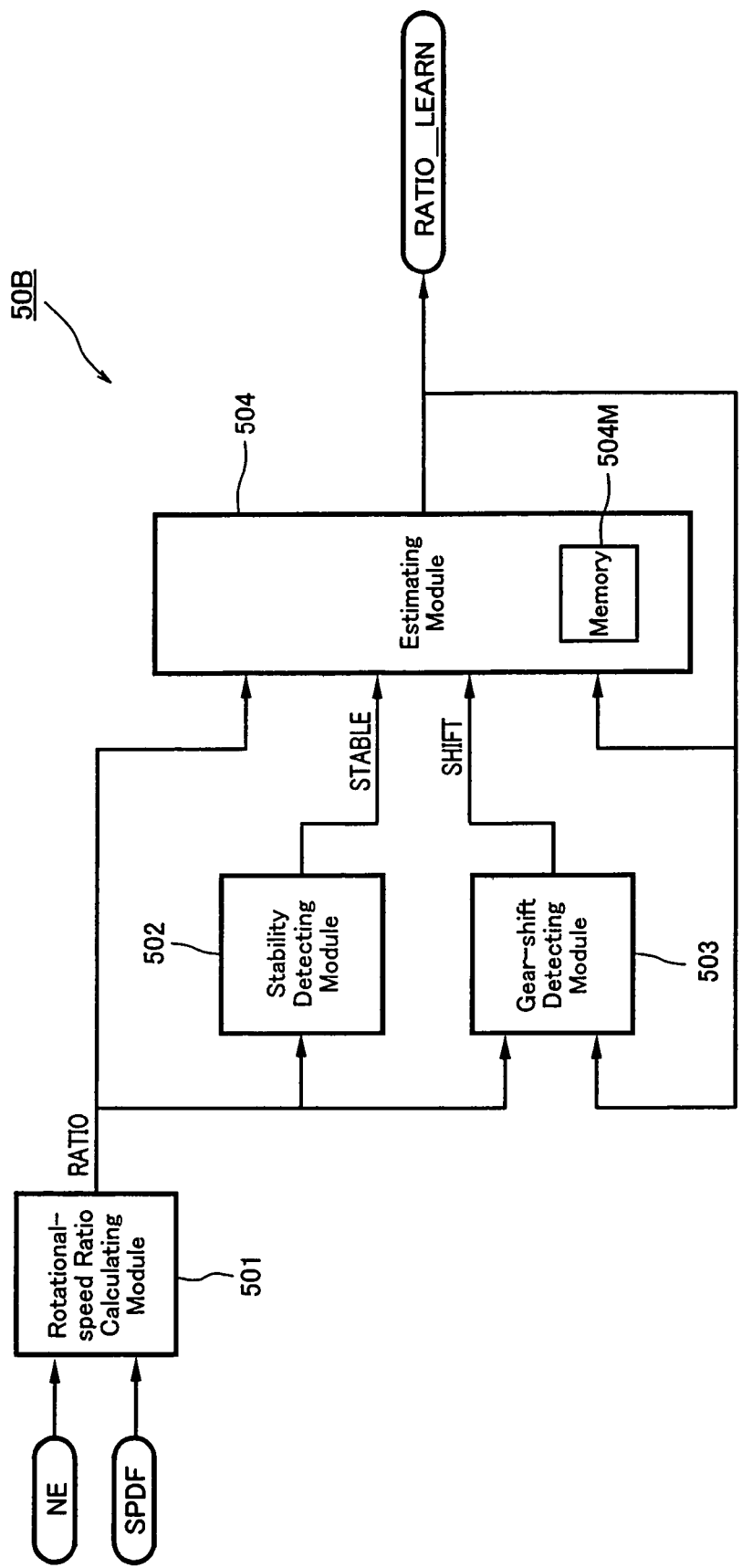
FIG. 2 is a block diagram showing a configuration of a transmission ratio estimating apparatus of the motorcycle of FIG. 1.

Next, referring to FIG. 2, a configuration of the transmission ratio estimating apparatus 50B will be explained in detail. The transmission ratio estimating apparatus 50B includes a rotational-speed ratio calculating module 501, a stability detecting module 502, an estimation process module 504, and a gear-shift detecting module 503.

The rotational-speed ratio calculating module 501 calculates a rotational-speed ratio RATIO(t) between the input shaft (crankshaft) and the output shaft (drive shaft) by the following Equation (1) based on the input shaft rotational speed (crankshaft rotational speed) NE and the output shaft rotational speed (drive shaft rotational speed) SPDF, given from each sensor.

| Rotational-speed Ratio Calculating Module |
| --- |
| RATIO(t) = NE(t)/SPDF(t)     (1) |
| Here,<br>RATIO: Rotational-speed ratio (between crankshaft and drive shaft),<br>NE: Input shaft rotational speed (crankshaft), and<br>SPDF: Output shaft rotational speed (drive shaft). |

The stability detecting module 502 compares the rotational-speed ratio RATIO(t) at a time t calculated by the rotational-speed ratio calculating module 501 with the rotational speed ratio RATIO(t−τ) that is calculated at a time that is a predetermined time (a determination time τ) before the time t by the rotational-speed ratio calculating module 501. Thus, the stability detecting module 502a detects an existence of a specific micro-change in the rotational-speed ratio caused during operation by a clearance, such as backlash of gears, clearance of damper elements, etc., using the following Equation (2). Here, the stability detecting module 502 outputs "stable" if the specific micro-change is not detected, or outputs "unstable" if the specific micro-change is detected (Equations (3) and (4)).

| Stability Detecting Module |
| --- |
| <IF><br>STABLE_LOW <= RATIO(t)/RATIO(t−τ) <= STABLE_HIGH     (2)<br><THEN><br>STABLE(t) = 1 (stable)     (3)<br><ELSE><br>STABLE(t) = 0 (unstable)     (4) |
| Here,<br>STABLE_LOW: Lower limit of stability detection value (0.90-0.99),<br>STABLE_HIGH: Upper limit of stability detection value (1.01-1.10), and<br>τ: Determination time (100-500 ms). |

That is, the stability detecting module 502 outputs a value "1" as STABLE(t) when RATIO(t)/RATIO(t−τ) is greater than the predetermined STABLE_LOW and less than the predetermined STABLE_HIGH, so that the value "1" represents a "stable" condition. On the other hand, the stability detecting module 502 outputs a value "0" as STABLE(t) so that the value "0" represents an "unstable" condition.

The values of STABLE_LOW and STABLE_HIGH are suitably set based on the micro-change in the rotational-speed ratio to be detected and the configuration and operational environment of the power transmission path section. In this embodiment, STABLE_LOW may be a value within a range of 0.90-0.99 and STABLE_HIGH may be a value within a range of 1.01-1.10, for example.

In this embodiment, the stability detecting module 502 is configured to use RATIO(t)/RATIO(t−τ) to compare the rotational-speed ratio RATIO(t) with the rotational-speed ratio RATIO(t−τ). Alternatively, the stability detecting module 502 may use a difference value between the rotational-speed ratio RATIO(t) and the rotational-speed ratio RATIO(t−τ) to achieve a similar determination.

Alternatively, an additional configuration that can calculate a differentiated value of RATIO(t) may be provided, and the stability detecting module 502 may use the differentiated value for the determination.

The gear-shift detecting module 503 compares the rotational-speed ratio RATIO(t) calculated by the rotational-speed ratio calculating module 501 at a time t with a transmission ratio estimated value RATIO_LEARN(t−Δt) that is calculated by the estimation process module 504 at a predetermined time (control cycle Δt) before the time t. Thus, the gear-shift detecting module 503 detects an existence of a specific transmission ratio unstable state at the time of a gear shift, etc., using the following Equation (5). Here, the gear-shift detecting module 503 outputs "with no gear shift" if the specific transmission ratio unstable state is not detected, or outputs "with gear shift" if the specific transmission ratio unstable state is detected (Equations (6) and (7)). Here, the control cycle Δt is set to a cycle much shorter than the determination time τ in the stability detecting module 502.

| Gear-shift Detecting Module | |
| --- | --- |
| <IF><br>SHIFT_UP <= RATIO(t)/RATIO_LEARN(t−Δt) <=<br>SHIFT_DOWN<br><THEN><br>SHIFT(t) = 0 (with no gear shift)<br><ELSE><br>SHIFT(t) = 1 (with gear shift) | (5)<br><br><br><br>(6)<br><br>(7) |
| Here,<br>RATIO_LEARN: Estimated transmission ratio,<br>SHIFT_UP: Lower limit of upshift detection value (0.7-0.9),<br>SHIFT_DOWN: Upper limit of downshift detection value (1.1-1.3), and<br>Δt: Control cycle (5-100 ms). | |

That is, the gear-shift detecting module 503 outputs a value "0" as SHIFT(t) when RATIO(t)/b RATIO_LEARN(t−Δt) is greater than the predetermined SHIFT_UP and less than the predetermined SHIFT_DOWN, so that the value "0" represents "with no gear shift." Otherwise, the gear-shift detecting module 503 outputs a value "1" as SHIFT(t) so that the value "1" represents "with gear shift."

The values of SHIFT_UP and SHIFT_DOWN are suitably set based on the configuration and operating environment of the power transmission path section, and the condition of the gear shift to be detected, etc. In this embodiment, SHIFT_UP is a value within the range of 0.7-0.9, and SHIFT_DOWN is a value within the range of 1.1-1.3, for example.

In this embodiment, the gear-shift detecting module 503 uses RATIO(t)/RATIO_LEARN(t−Δt) to compare the rotational-speed ratio RATIO(t) with the transmission ratio estimated value RATIO_LEARN(t−Δt). Alternatively, a difference value between the rotational-speed ratio RATIO(t) and the transmission ratio estimated value RATIO_LEARN(t−Δt) may be used to achieve a similar determination.

The estimation process module 504 determines an acceptability of the rotational-speed ratio RATIO(t) calculated by the rotational-speed ratio calculating module 501 based on STABLE(t) outputted from the stability detecting module 502 and SHIFT(t) outputted from the gear-shift detecting module 503, and calculates a transmission ratio estimated value RATIO_LEARN(t) according to the acceptability. The calculated RATIO_LEARN(t) is stored in the memory 504M.

| Estimating Module | |
|---|---|
| <IF> | |
| STABLE(t) = 1 (stable) and SHIFT(t) = 0 (with no gear shift) | (8) |
| <THEN> | |
| RATIO_LEARN(t) = | |
| RATIO(t) * weight+RATIO_LEARN(t−Δt) * (1−weight) | |
| (updated estimated value) | (9) |
| <IF> | |
| STABLE(t) = 0 (unstable) | (10) |
| <THEN> | |
| RATIO_LEARN(t) (inhibit update of estimated value) = | |
| RATIO_LEARN(t−Δt) | (11) |
| <IF> | |
| STABLE(t) = 1 (stable) and SHIFT(t) = 1 (with gear shift) | (12) |
| <THEN> | |
| RATIO_LEARN(t) = RATIO(t) (reset estimated value) | (13) |

Here,
weight: Weighted coefficient (0.01-0.5).

For example, since there is no micro-change in the transmission ratio and no gear shift, etc. when the condition of Equation (8) is satisfied, the rotational-speed ratio RATIO(t) calculated by the rotational-speed ratio calculating module 501 is accepted. In addition, in order to smooth the values, a moving average of the rotational-speed ratios RATIO(t) is calculated, and the calculated values (i.e., a transmission ratio estimated value RATIO_LEARN(t)) is outputted (Equation (9)).

On the other hand, if the condition of Equation (10) is satisfied, it is determined that the rotational-speed ratio RATIO(t) calculated by the rotational-speed ratio calculating module 501 should not be accepted because there is micro-change in the transmission ratio. Then, the value of RATIO_LEARN at a predetermined time Δt before the time t stored in the memory 504M (i.e., RATIO_LEARN (t−Δt)) is continued to be outputted as the transmission ratio estimated value RATIO_LEARN(t) (Equation (11)). In this way, when the transmission ratio estimated value deviates to be an eccentric value, the value in not written to the memory 504M (inhibit updating).

Alternatively, if the condition of Equation (12) is satisfied, the transmission ratio estimated value RATIO_LEARN(t) is initialized (Reset) to a suitable value, since there is no micro-change in the transmission ratio, and the gear shift is carried out (Equation (13)). Here, it is reset to RATIO(t) and this is outputted as the transmission ratio estimated value RATIO_LEARN(t).

In this embodiment, the memory 504M is configured to store the current detected data and the prior detected or calculated data before the predetermined time (for example, the determination time τ, control cycle Δt, etc.). Alternatively, more numbers of data may be stored in the memory 504M to obtain a more stable output value.

FIGS. 3A-3D are graphs showing changes in each control parameter of the rotational-speed ratio calculating module 501 and the stability detecting module 502 when changing a rotation of the input shaft from deceleration to acceleration. As shown in FIG. 3A, as the input shaft rotational speed NE(t) is decreased, the output shaft rotational speed SPDF(t) also decreases to follow. Then, if the input shaft rotational speed NE(t) is increased (at time t1), however, the output shaft rotational speed SPDF(t) does not immediately follow because of the clearance in the power transmission path section, but starts to follow with a delay (at time t2). As soon as the clearance is used up, the output shaft rotational speed SPDF(t) starts to increase. However, on the other hand, once the input shaft rotational speed NE(t) is pulled down by the output shaft rotational speed SPDF(t) then, it starts to increase again (at time t3). This is an "acceleration shock", which is typically produced by the backlash of the gears in the transmission device, etc.

Since the input shaft rotational speed NE(t) is relatively greater than the output shaft rotational speed SPDF(t) during the time t1-t3, as shown in FIG. 3B, RATIO(t) becomes greater on the plus side. As shown with a dashed line in FIG. 3B, RATIO(t−τ) is delayed by the time τ (t1a, t2a, and t3a).

As shown in FIG. 3C, since RATIO(t) is relatively greater than RATIO(t−τ) during time t1-t3, RATIO(t)/RATIO(t−τ) becomes greater on the plus side. In FIG. 3C, RATIO(t)/RATIO(t−τ) exceeds STABLE_HIGH during time t4-t5, and peaks at time t2. On the other hand, during time t1a-t3a, since RATIO(t) becomes relatively less than RATIO(t−τ), RATIO(t)/RATIO(t−τ) becomes greater on the minus side. In FIG. 3C, RATIO(t)/RATIO(t−τ) exceeds STABLE_LOW during time t4a-t5a, and peaks at time t2a.

As shown in FIG. 3D, STABLE(t) moves from "1 (stable)" to "0 (unstable)" during time t4-t5 in which RATIO(t)/RATIO (t−τ) exceeds STABLE_HIGH. Similarly, STABLE(t) moves from "1 (stable)" to "0 (unstable)" during time t4a-t5a in which RATIO(t)/RATIO(t−τ) exceeds STABLE_LOW.

FIGS. 4A-4D are graphs showing changes in each control parameter of the rotational-speed ratio calculating module 501 and the stability detecting module 502 when changing rotation of the input shaft from acceleration to deceleration. Since each control parameter of FIGS. 4A-4D shows a substantially reversed action of FIGS. 3A-3D, the detailed explanation thereof will be omitted.

Figure 5A:
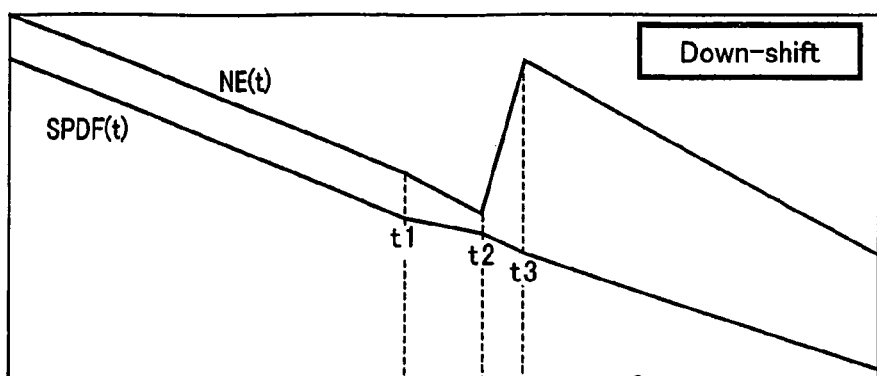
FIGS. 5A-5G are graphs showing changes in the control parameters of the transmission ratio estimating apparatus of FIG. 2, during a downshift, with a common time represented as the x-axis.

FIGS. 5A-5G are graphs showing changes in each control parameter of the rotational-speed ratio calculating module 501, the gear-shift detecting module 503, and the stability detecting module 502, at the time of downshift. As shown in FIG. 5A, if the input shaft rotational speed NE(t) is decreased, the output shaft rotational speed SPDF(t) also decreases to follow. Then, when a downshift is carried out (at time t1), the output shaft rotational speed SPDF(t) continues to decrease due to cutting of the clutch in the power transmission path section. Then, when the clutch is connected, the output shaft rotational speed SPDF(t) still continues to decrease due to an inertia of the motorcycle 10. On the other hand, the input shaft rotational speed NE(t) jumps up due to the downshift (at time t2) and, then, the input shaft rotational speed NE(t) is pulled down by the output shaft rotational speed SPDF(t) and starts to decrease (at time t3). This is what is called an "engine brake." Then, the input shaft rotational speed NE(t) decreases at the same rate as the output shaft rotational speed SPDF(t) when the engine brake takes effect.

Figure 5B:
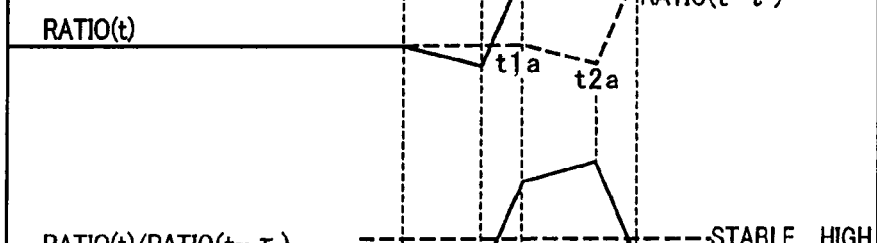

Since the input shaft rotational speed NE(t) is greater than the output shaft rotational speed SPDF(t) during time t2-t3, as shown in FIG. 5B, RATIO(t) becomes greater on the plus side, and this condition is maintained. As shown with a dashed line in FIG. 5B, RATIO(t−τ) delays by time τ (t1a, t2a, and t3a).

Figure 5C:
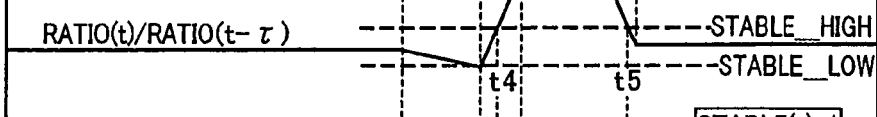

As shown in FIG. 5C, RATIO(t)/RATIO(t−τ) becomes greater mostly on the plus side during time t2-t3a according to the length of time τ. In FIG. 5C, during time t4-t5, an example of RATIO(t)/RATIO(t−τ) exceeding STABLE_HIGH is shown.

Figure 5D:

As shown in FIG. 5D, STABLE(t) moves from "1 (stable)" to "0 (unstable)" during time t4-t5 in which RATIO(t)/RATIO(t−τ) exceeds STABLE_HIGH.

Figure 5E:
Figure 5F:
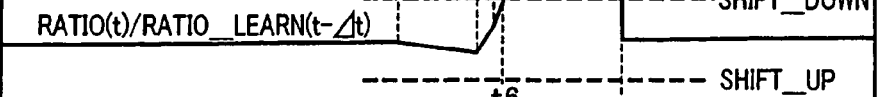

RATIO_LEARN(t) changes as shown in FIG. 5E, and RATIO(t)/RATIO_LEARN(t−Δt) changes as shown in FIG. 5F. In FIG. 5F, an example of RATIO(t)/RATIO_LEARN(t−Δt) exceeding SHIFT_DOWN during time t6-t5, as RATIO(t) greatly increases during time t2-t3, is shown.

Figure 5G:
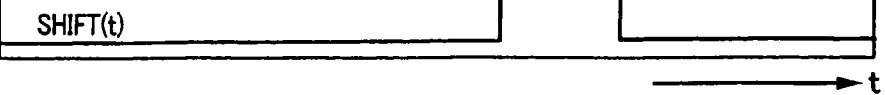

While RATIO(t)/RATIO_LEARN(t−Δt) exceeds SHIFT_DOWN, as shown in FIG. 5G; SHIFT(t) becomes "1 (with gear shift)." Thus, as shown in FIG. 5D, by time t4, since STABLE(t) is "1 (stable)" and SHIFT(t) is "0 (with no gear shift)", the estimating module 504 calculates RATIO_LEARN(t) using the Equation (9) and updates the stored value in the memory 504M with the calculated value.

In the example of FIGS. 5D and 5G; while STABLE(t) is "0 (unstable)", SHIFT(t) is "1 (with gear shift)". Thereby, during time t4-t5, the estimating module 504 calculates RATIO_LEARN(t) according to equation (11). That is, the stored value in the memory 504M is maintained (inhibit updating).

Then, when STABLE(t) becomes "1 (stable)" and SHIFT(t) becomes "0 (with no gear shift)" after the time t5, the estimating module 504 calculates RATIO_LEARN(t) according to the Equation (13). That is, the stored value in the memory 504M is initialized by RATIO(t) (reset estimated value).

FIGS. 6A-6D are graphs showing changes in each control parameter of the rotational-speed ratio calculating module 501, the stability detecting module 502, and the gear-shift detecting module 503, at the time of a downshift. However, since each control parameter shows an almost reversed action of FIGS. 5A-5D, the detailed explanation thereof will be omitted herein.

Alternatively, it may be possible to add a time limiter to achieve a malfunction judging function of a transmission ratio estimated value. For example, if the above-mentioned gear-shift detection control is not carried out, it may be possible to determine that the estimation is abnormal when an unstable state continues more than a predetermined time (for example, approximately 2-5 seconds). Alternatively, if the above-mentioned gear-shift detection control is carried out, an abnormal estimation may be determined when an unstable state and a no-gear-shift detecting state continue more than a predetermined time (for example, approximately 1-2 second(s)). Alternatively, an abnormal estimation may be determined when a gear-shift detecting state continues more than a predetermined time (for example, approximately 2-5 seconds).

The Second Embodiment

Figure 7:
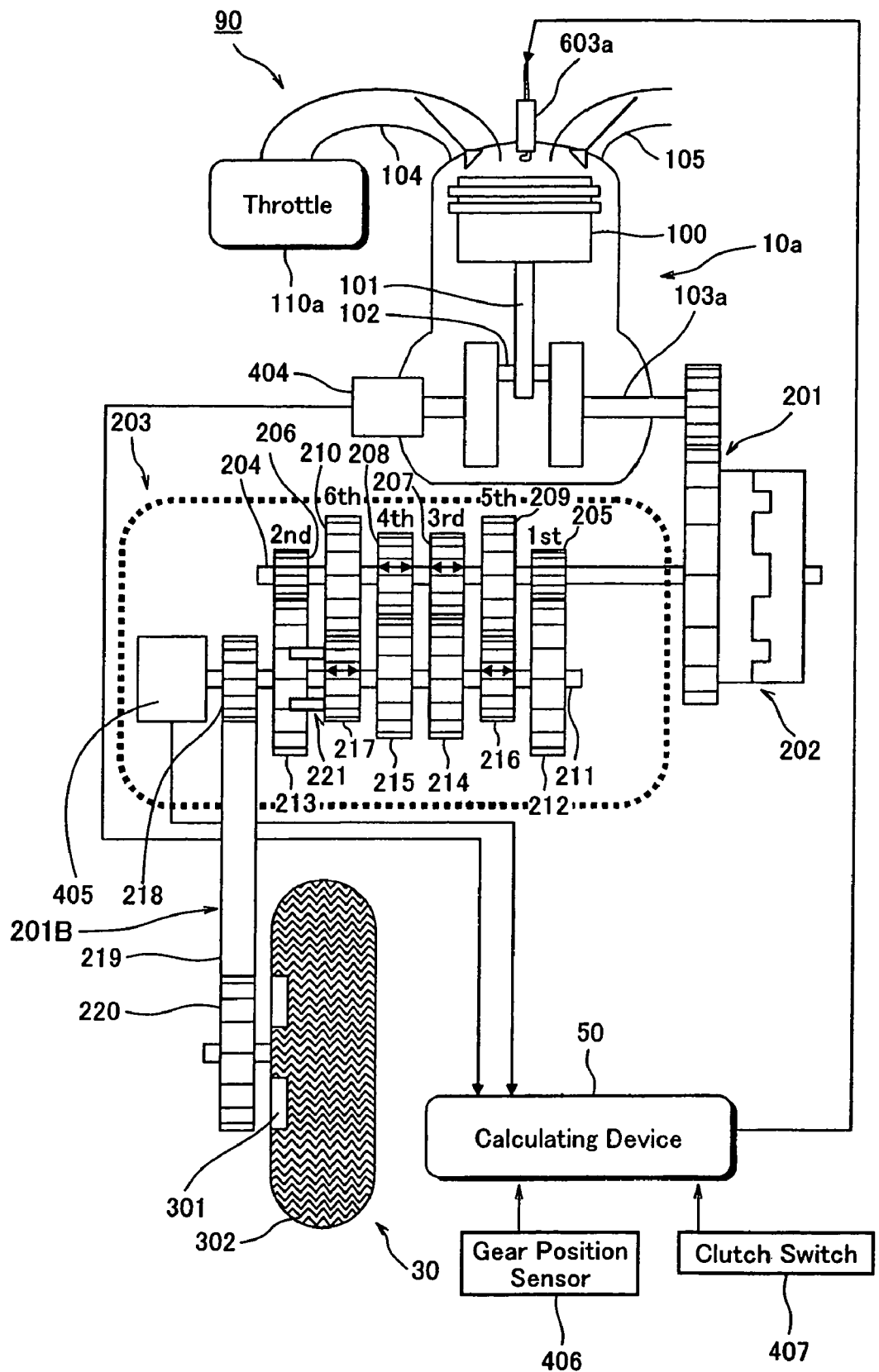
FIG. 7 is a schematic block diagram showing another configuration of the motorcycle according to a second embodiment of the present invention.

The transmission ratio estimating apparatus according to the first embodiment may be utilized in the following applications. For example, FIG. 7 shows an example of a vehicle 90. The vehicle 90 includes an internal-combustion engine 10a of a forced-ignition type as the driving source 10. Although the internal-combustion engine 10a is shown as a reciprocal internal-combustion engine with one cylinder, any other types of internal-combustion engines may also be applicable.

The internal-combustion engine 10a includes a connecting rod 101. A lower end portion of the connecting rod 101 is coupled to a crank pin 102. One end of the crankshaft 103a which continues from the crank pin 102 is connected to a clutch 202 through a primary transmission system 201. The input shaft sensor 404 is provided in the other end portion of the crankshaft 103a, and detects a rotational speed of the crankshaft 103a (i.e., an engine speed).

The primary transmission system 201 is coupled to a main shaft 204 as an input shaft of a transmission device 203 through the clutch 202 therebetween. Inside the transmission device 203, first through sixth gears 205-210 are provided on the main shaft 204 from the clutch 202 side. In parallel with the main shaft 204, in the transmission device 203, a drive shaft 211 as an output shaft of the transmission device 203 is arranged. First through sixth gears 212-217, a drive sprocket 218, and an output shaft sensor 405 are provided on the drive shaft 211 from the clutch 202 side.

Here, the first through sixth gears 205-210 on the main shaft 204 and the first through sixth gears 212-217 on the drive shaft 211 are constantly engaged with each other, respectively.

The drive sprocket 218 is coupled to a driven sprocket 220 through a chain 219. The drive sprocket 218, chain 219, and driven sprocket 220 constitute a secondary transmission system 201B. The driven sprocket 220 is coupled to a tire 302 through a coupling damper 301 provided inside a wheel 30.

In FIG. 7, an example in which the second and sixth gears 213, 217 on the drive shaft 211 are coupled to each other through a dog clutch 221 is shown. A linear motion of the piston 100 generated by combustion of the internal-combustion engine 10a is converted into a rotational motion of the crankshaft 103a by the connecting rod 101, crank pin 102, and crankshaft 103a, and is inputted into the main shaft 204 through the primary transmission system 201 and clutch 202. Then, this rotational motion is transmitted to the drive shaft 211 through one of the gear combinations of the first through sixth gears 205-210 on the main shaft 204 and the first through sixth gears 212-217 on the drive shaft 211. The transmitted rotational motion drives the wheel 30 (and tire 302) successively through the drive sprocket 218, chain 219, and driven sprocket 220. Alternatively, when the internal-combustion engine 10a does not generate a power, a torque of the tire 302 rotates the crankshaft 103a through the power transmission path in the reversed direction and, then, operates the piston 100.

A throttle (a throttle valve or throttle body) 110a is provided in an air-intake passage 104 of the internal-combustion engine 10a. A reference numeral 105 represents an exhaust passage.

In this embodiment, a controlled section in the power transmission path is between the crankshaft 103a and the drive shaft 211. The input shaft sensor 404 detects the rotational speed of the crankshaft 103a as the input shaft, and gives the detection result to the calculating device 50, while the output shaft sensor 405 detects a rotational speed of the drive shaft 211 as the output shaft, and gives the detection result to a calculating device 50.

The calculating device 50 includes the function of the transmission ratio estimating apparatus of the first embodiment. The calculating device 50 is connected with a spark plug 603a of the internal-combustion engine 10a. The calculating device 50 performs an acceleration/deceleration control, which will be explained in full detail hereinafter, based on the detection results given, respectively, from the input shaft sensor 404 and the output shaft sensor 405, so that it performs a retard/advance of the internal-combustion engine 10*a* (or a deceleration/acceleration of the vehicle) by an ignition control of the spark plug 603*a*.

Alternatively, the calculating device 50 may be connected with a gear position sensor 406. For example, the gear position sensor 406 detects which gear position the gear is shifted or whether the gear is in the neutral position, and gives the detection result to the calculating device 50. The calculating device 50 restricts an output of ignition instruction to the spark plug 603*a* when the detection result that the gear is in the neutral position from the gear position sensor 406 is given. The calculating device 50 permits the output of the ignition instruction to the spark plug 603*a* when the detection result that the gear is in one of the gear positions.

The calculating device 50 may be connected with a clutch switch 407. For example, it may be possible to filter the output of the ignition instruction to the spark plug 603*a* when the clutch is cut (that is, when the clutch switch 407 is ON) even if a relative rotational speed difference is produced.

In this embodiment, although the controlled section in the power transmission path is defined as a section between the crankshaft 103*a* and the drive shaft 211, hereinafter, a clearance of the dog clutch 221 in the transmission device 203 will be explained to simplify the explanation. The dog clutch 221 typically engages/disengages dog teeth and dog holes and, thus, there is a clearance between each of the dog teeth and each of the dog holes in the rotational direction. Here, if assuming a condition in which the dog clutch 221 carries out a steady rotation into one direction while it is connected, each dog tooth contacts one end of the dog hole in the rotational direction. When steady rotation collapses and a relative rotational speed between an upper stream side and a lower stream side of the power transmission path, bordering on the clearance, is produced, the dog tooth disengages from one end of the dog hole, and contacts the other end in due course. As described herein, this contact from one end to the other end, and vice versa is referred to as "re-contact." When a transmission torque of the re-contact is large, an operator of the vehicle may feel what is called an "acceleration shock" or a "deceleration shock." The calculating device 50 is configured to perform the acceleration/deceleration control so that it reduces the acceleration and deceleration shock by decreasing the relative rotational speed and/or the transmission torque at the time of the re-contact as much as possible.

One contacting condition of the dog clutch 221 during an acceleration of the vehicle is referred to as "the dog clutch 221 being on the acceleration side", and the other contacting condition of the dog clutch 221 during deceleration of the vehicle is referred to as "the dog clutch 221 being on the deceleration side."

The calculating device 50 calculates a rotational speed difference (i.e., a relative rotational speed) between the crankshaft 103*a* and the drive shaft 211 based on the rotational speed of the crankshaft 103*a* detected by the input shaft sensor 404 (the input shaft rotational speed), and the rotational speed of the drive shaft 211 detected by the output shaft sensor 405 (the output shaft rotational speed). Here, since the primary transmission system 201, the transmission device 203, etc. intervene in the power transmission path section between the crankshaft 103*a* and the drive shaft 211, it may be necessary to convert one of the rotational speeds by multiplying the transmission ratio of the path section so that the one of the rotational speeds corresponds to the other rotational speed. The transmission ratio used for this conversion may be obtained by a function of the transmission ratio estimating apparatus.

The calculating device 50 estimates a relative rotational position by integrating with the relative rotational speed calculated in this way. The size of the clearance (for example, the total amount of motion of the dog tooth within the dog hole in the rotational direction) typically is known, and such information may be stored in the memory (not illustrated) within the calculating device 50. The calculating device 50 may calculate timing of the re-contact between the dog tooth and the dog hole, and a relative rotational speed at the time of re-contact based on the relative rotational speed and the relative rotational position.

If the relative rotational speed is not changed by the time of the re-contact from the disengagement of the dog tooth and the dog hole, or can be assumed so, the relative rotational speed at the time of re-contact may be assumed as the same speed as the relative rotational speed at the time of detection. Alternatively, if the vehicle is further slowed down, or the throttle 110*a* is opened, a degree of the deceleration, a throttle opening, etc. may also be detected since the relative rotational speed changes. Then, in order to calculate the relative rotational speed at the time of re-contact more precisely, it may be possible to correct the timing of re-contact and the relative rotational speed at the time of re-contact, calculated as mentioned above.

According to the timing of re-contact and the relative rotational speed at the time of re-contact, the calculating device 50 determines a retard/advance start time, an amount of retard/advance, and a retard/advance end time, and controls an ignition timing of the spark plug 603*a* by controlling a feeding power to the ignition coil. When the deceleration shock is expected, the calculating device 50 increases the input shaft rotational speed or the torque at the time of re-contact so that it reduces the deceleration shock. On the other hand, when the acceleration shock is expected, the calculating device 50 decreases the input shaft rotational speed or the torque at the time of re-contact so that it reduces the acceleration shock.

Figure 8:
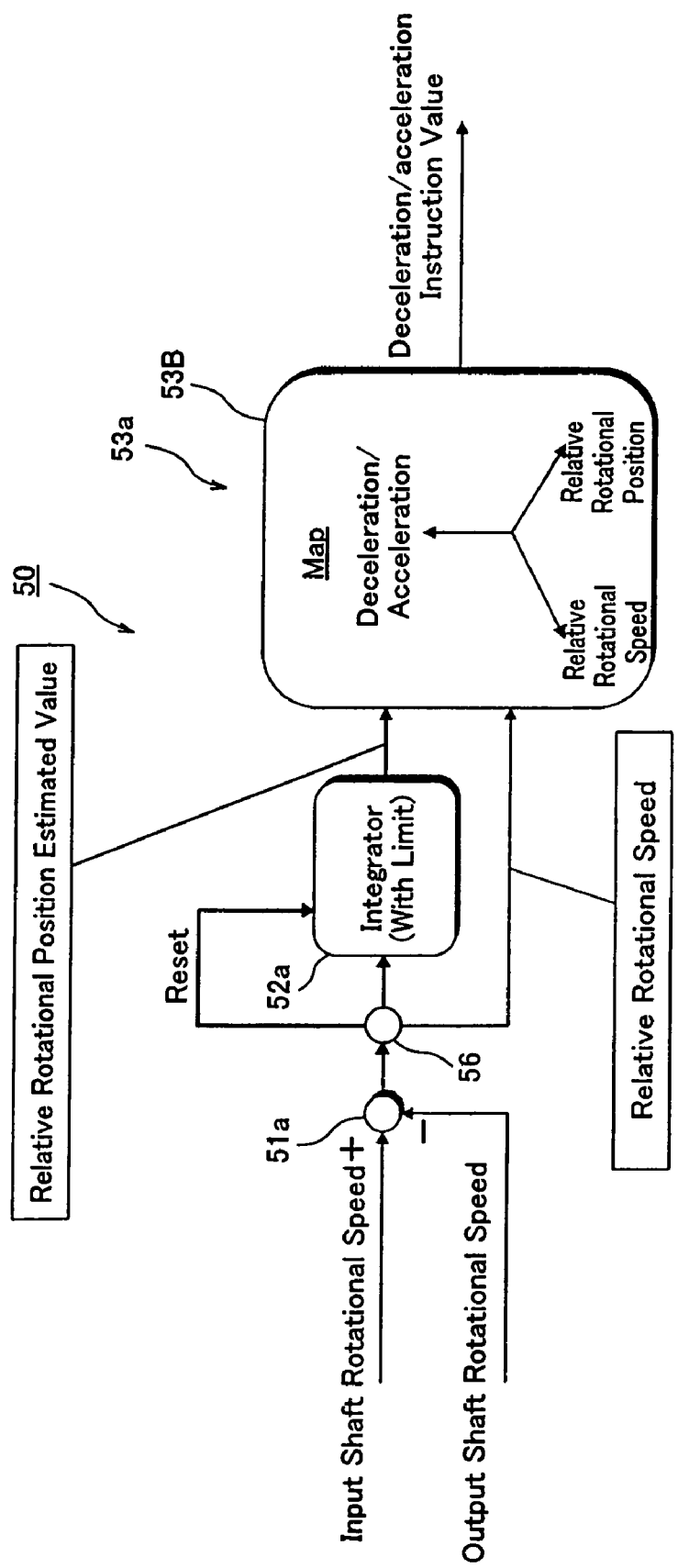
FIG. 8 is a control block diagram showing a configuration of a calculating device of the motorcycle of FIG. 7.

The deceleration/acceleration start time, the amount of deceleration/acceleration, the deceleration/acceleration end time, etc. corresponding to the relative rotational speed and the relative rotational position which are detected may also be provided as a map (see FIG. 8). It will be appreciated by those skilled in the art that a mathematical equation may be used to obtain the same result without being dependent on the map.

Although the acceleration/deceleration control particularly for the clearance in the transmission device 203, and more particularly for the clearance of the dog clutch of each transmission gear has been explained, the control may be applied to a backlash between the transmission gears mating each other, and a clearance of splines between the transmission gear and the shaft thereof, etc. The control may be applied to any clearance in the power transmission path, such as a clearance in the primary transmission system 201, a clearance between the chain 219 and drive sprocket 218, a clearance between the chain 219 and the drive sprocket 220, a clearance of the chain 219, a clearance of the coupling damper 301, etc. The input-shaft/output-shaft sensors, and the acceleration/deceleration module (which in this embodiment is the spark plug 603*a*) may be arranged in positions corresponding to the target clearance.

As shown in FIG. 8, the calculating device 50 includes a differentiator 51*a*. The differentiator 51*a* calculates the rotational-speed difference (i.e., a relative rotational speed) between the input shaft rotational speed and the output shaft rotational speed. The calculated relative rotational speed is transmitted to a control module 53a through a branch module 56, and also to the integrator 52a. The integrator 52a estimates a relative rotational position by integrating the relative rotational speeds, and the estimated relative rotational position is transmitted to the control module 53a. The branch module 56 includes a function in which it can reset the integrated value of the integrator 52a.

The control module 53a includes a map 53B that is used by the control logic thereof. The map 53B stores deceleration/acceleration instruction values corresponding to the relative rotational speeds and the relative rotational positions. In this embodiment, the map 53B stores retard/advance start time values corresponding to the relative rotational positions. The map 53B may store amount of deceleration/acceleration corresponding to relative rotational positions of the input shaft and the output shaft, input shaft rotational speeds, and/or output shaft rotational speed, rates of change (differentiated values) in the input shaft rotational speeds and/or the output shaft rotational speeds, rotational-speed differences between the input shaft rotational speeds and the output shaft rotational speeds, rates of change (differentiated value) in the rotational-speed differences between the input shaft rotational speeds and the output shaft rotational speeds, throttle openings, rates of change (differentiated value) in the throttle openings, etc. The map 53B may also store deceleration/acceleration end time values. The control module 53a refers to the map 53B based on the relative rotational speed transmitted from the differentiator 51a and the relative rotational position estimated value transmitted from the integrator 52a, calculates deceleration/acceleration instruction value, and outputs the calculated deceleration/acceleration instruction value to the spark plug 603a.

As mentioned above, since a quantity of the target clearance typically is an invariable value and may be obtained beforehand, it is desirable to constitute the integrator 52a with an integrator limit to restrict the integrated value of the integrator 52a with a value corresponding to the amount of clearance, so that the instruction value does not become an impossible value. Alternatively, a dead band may be added to an input of the integrator 52 so that the integrator 52 may not perform an integration when the relative rotational speed is very small.

In this embodiment, it is configured so that the deceleration/acceleration instruction values corresponding to various relative rotational speeds and relative rotational positions are calculated off-line and stored in the map 53B. Alternatively, it may be configured so that the deceleration/acceleration instruction values are calculated on real time using a predetermined simulation model provided in the control module 53a.

Figure 9A:
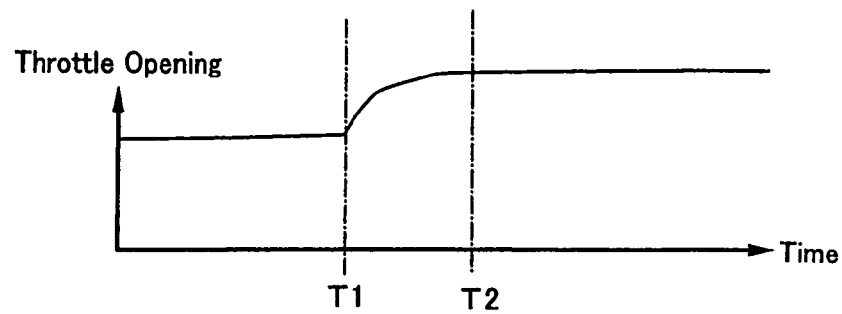
FIGS. 9A-9E shows graphs for explaining functions of the calculating device of FIGS. 7 and 8, with a common time represented as the x-axis.
Figure 9B:
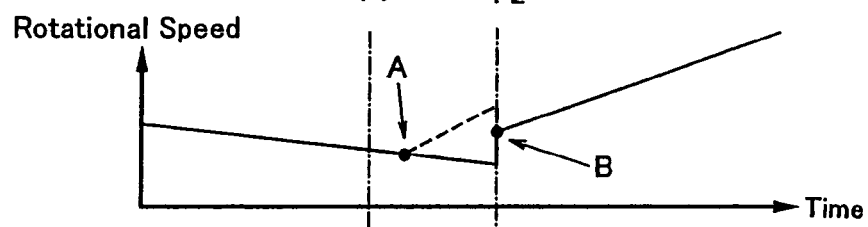
Figure 9C:
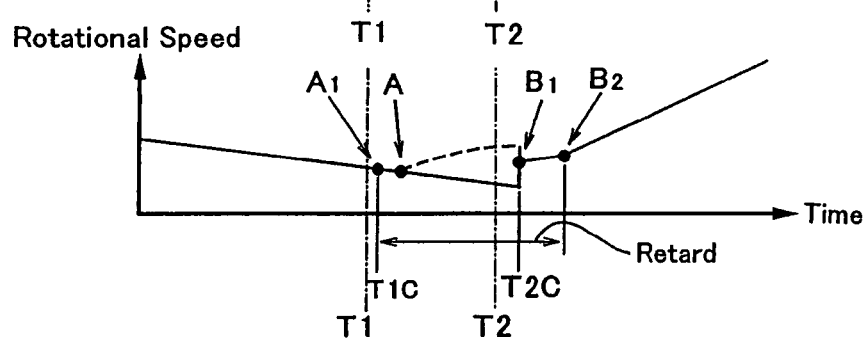
Figure 9D:
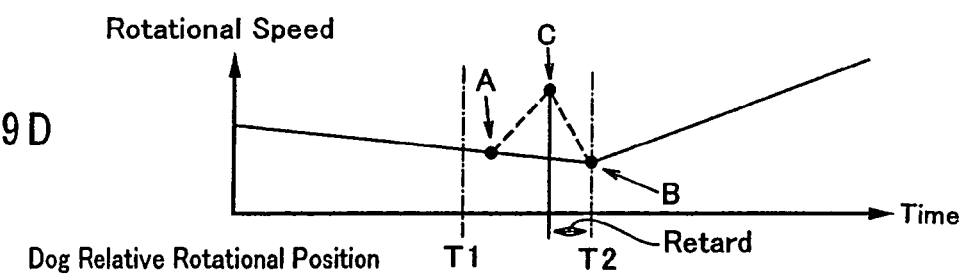
Figure 9E:
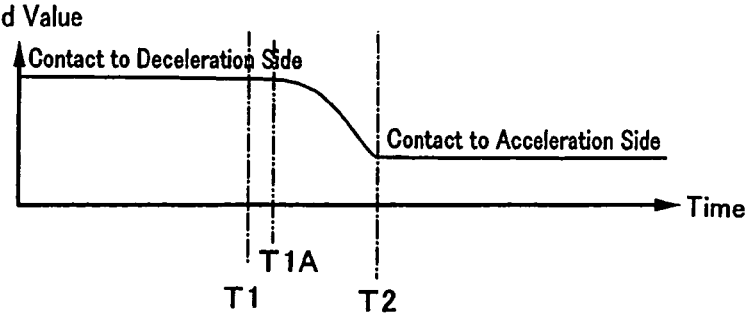

FIGS. 9A-9E are graphs for explaining effects of the acceleration/deceleration control according to this embodiment. FIG. 9A shows throttle opening. FIG. 9B shows rotational speeds of the input shaft and the output shaft, when any particular control is not carried out. FIG. 9C shows rotational speeds of the input shaft and the output shaft, when an ignition retard control based on the rate of change in the throttle opening is carried out. FIG. 9D shows rotational speeds of the input shaft and the output shaft, during the acceleration/deceleration control according to this embodiment. FIG. 9E shows the estimated value of the dog relative rotational position, respectively. In FIGS. 9A-9E, the x-axis represents the common time.

Hereinafter, a time-sequential change in the rotational speeds of the input shaft and the output shaft under each control will be explained, assuming at the time of opening the throttle 110a and accelerating from a state in which the vehicle is slowing down.

Here, a constant deceleration is performed until time T1, and as the throttle opening is shown in FIG. 9A, an acceleration is performed by opening the throttle 110a from time T1. As the dog clutch relative rotational position estimated value is shown in FIG. 9E, the dog clutch 221 starts to move within the range of clearance from the deceleration end at time T1A which is a little behind from time T1. The dog clutch 221 re-contacts to the acceleration end at time T2.

The rotational speed with no particular control is shown in FIG. 9B. First, in FIG. 9B, both the rotational speeds of the input shaft and the output shaft decrease, and only the input shaft rotational speed (shown with a dashed line in FIG. 9B) starts increasing in accordance with opening the throttle 110a from a time T1A (at a point A). Due to the re-contact at time T2, the input shaft rotational speed decreases, while the output shaft rotational speed increases (at a point B) and, then, both the rotational speeds of the input shaft and the output shaft start increasing.

Next, the rotational speed under the ignition retard control based on the rate of change in the throttle opening is shown in FIG. 9C. At the beginning, in FIG. 9C, both the rotational speeds of the input shaft and the output shaft decrease until time T1A, similar to the condition when no particular control is carried out as mentioned above. Although the ignition retard control is performed from time T1C which is earlier than time T1A (at the point A1), a start timing of the control is too early, and an increase of the input shaft rotational speed (shown with a dashed line in FIG. 9C) is late (at the point A). Then, although a re-contact starts at time T2C which is later than time T2, a time until the completion of re-contact becomes long, and an increase of the rotational speeds of both the input shaft and the output shaft is delayed (at a point B2). In addition, a shock at time T2C still remains (at a point B1).

Next, the rotational speeds under the acceleration/deceleration control of this embodiment are shown in FIG. 9D. At the beginning, in FIG. 9D, both the rotational speeds of the input shaft and the output shaft decrease until time T1A, similar to the ignition retard control. However, the control is not started at time T1A, and only the input shaft rotational speed (shown with a dashed line in FIG. 9D) starts increasing (at the point A) in accordance with opening of the throttle from time T1A, similar to that when no particular control is performed. The control based on the dog relative rotational position estimated value is started later (at a point C) and, then, the input shaft rotational speed is decreased, and almost no relative rotational speed between the input shaft and the output shaft at the completion of re-contact is achieved (at the point B). To shorten the time of the control necessary to achieve the re-contact, the point C may be delayed as close to the point B as possible and, then, a brake may be applied so that the input shaft rotational speed rapidly decreases.

As this invention may be embodied in several forms without departing from the spirit of essential characteristics thereof, the present embodiments are therefore illustrative and not restrictive, since the scope of the present invention is defined by the appended claims rather than by the description preceding them and all changes that fall within the metes and bounds of the claims, or equivalence of such metes and bounds thereof are therefore intended to be embraced by the claims.

What is claimed is:

1. A method of estimating a transmission ratio of a power transmission path defined between an input shaft and an output shaft, the method comprising:

detecting a rotational speed of the input shaft;
detecting a rotational speed of the output shaft;
calculating a rotational-speed ratio between the detected rotational speed of the input shaft and the detected rotational speed of the output shaft;
determining whether or not a difference between the rotational-speed ratio calculated at a certain time and a rotational-speed ratio calculated earlier is within a first predetermined threshold value; and
estimating a value relating to the later rotational-speed ratio to be the transmission ratio of the power transmission path and storing the value in a memory if the difference between the rotational-speed ratios is determined to be within the first predetermined threshold value, while estimating a value relating to the earlier rotational-speed ratio stored in the memory to be the transmission ratio of the power transmission path if the difference between the rotational-speed ratios is determined not to be within the first predetermined threshold value.

2. An apparatus for estimating a transmission ratio of a power transmission path defined between an input shaft and an output shaft, the apparatus comprising:
an input shaft sensor for detecting a rotational speed of the input shaft;
an output shaft sensor for detecting a rotational speed of the output shaft;
a rotational-speed ratio calculating module configured to calculate a rotational-speed ratio between the rotational speed of the input shaft detected by the input shaft sensor and the rotational speed of the output shaft detected by the output shaft sensor;
a stability detecting module configured to determine whether or not a difference between the rotational-speed ratio calculated at a certain time by the rotational-speed ratio calculating module and the rotational-speed ratio calculated earlier by the rotational-speed ratio calculating module is within a first predetermined threshold value; and
an estimating module configured to estimate a value relating to the later rotational-speed ratio to be the transmission ratio of the power transmission path and store the value in a memory if the difference between the rotational-speed ratios is determined to be within the first predetermined threshold value by the stability detecting module, while estimating a value relating to the earlier rotational-speed ratio stored in the memory to be the transmission ratio of the power transmission path if the difference between the rotational-speed ratios is determined not to be within the first predetermined threshold value.

3. The transmission ratio estimating apparatus of claim 2, wherein the value relating to the rotational-speed ratio is a moving average value of the rotational-speed ratios calculated by the rotational-speed ratio calculating module.

4. The transmission ratio estimating apparatus of claim 2, further comprising a gear-shift detecting module configured to determine whether or not the difference between the later rotational-speed ratio calculated by the rotational-speed ratio calculating module and the transmission ratio estimated earlier by the estimating module is within a second predetermined threshold value.

5. The transmission ratio estimating apparatus of claim 4, wherein the gear-shift detecting module is configured to determine a downshift if the rotational-speed ratio is greater than the transmission ratio, while determining an upshift if the rotational-speed ratio is less than the transmission ratio.

6. The transmission ratio estimating apparatus of claim 4, wherein the estimating module is configured to estimate the value relating to the later rotational-speed ratio to be the transmission ratio of the power transmission path and store the value in the memory if the difference between the rotational-speed ratios is determined to be within the first predetermined threshold value by the stability detecting module, and if the difference between the later rotational-speed ratio and the transmission ratio is determined to be within the second predetermined threshold value by the gear-shift detecting module, while the estimating module is configured to estimate the value relating to the earlier rotational-speed ratio stored in the memory to be the transmission ratio of the power transmission path if the difference between the rotational-speed ratios is determined not to be within the first predetermined threshold value by the stability detecting module, and if the difference between the later rotational-speed ratio and the transmission ratio is determined not to be within the second predetermined threshold value by the gear-shift detecting module.

* * * * *